Patented Jan. 6, 1953

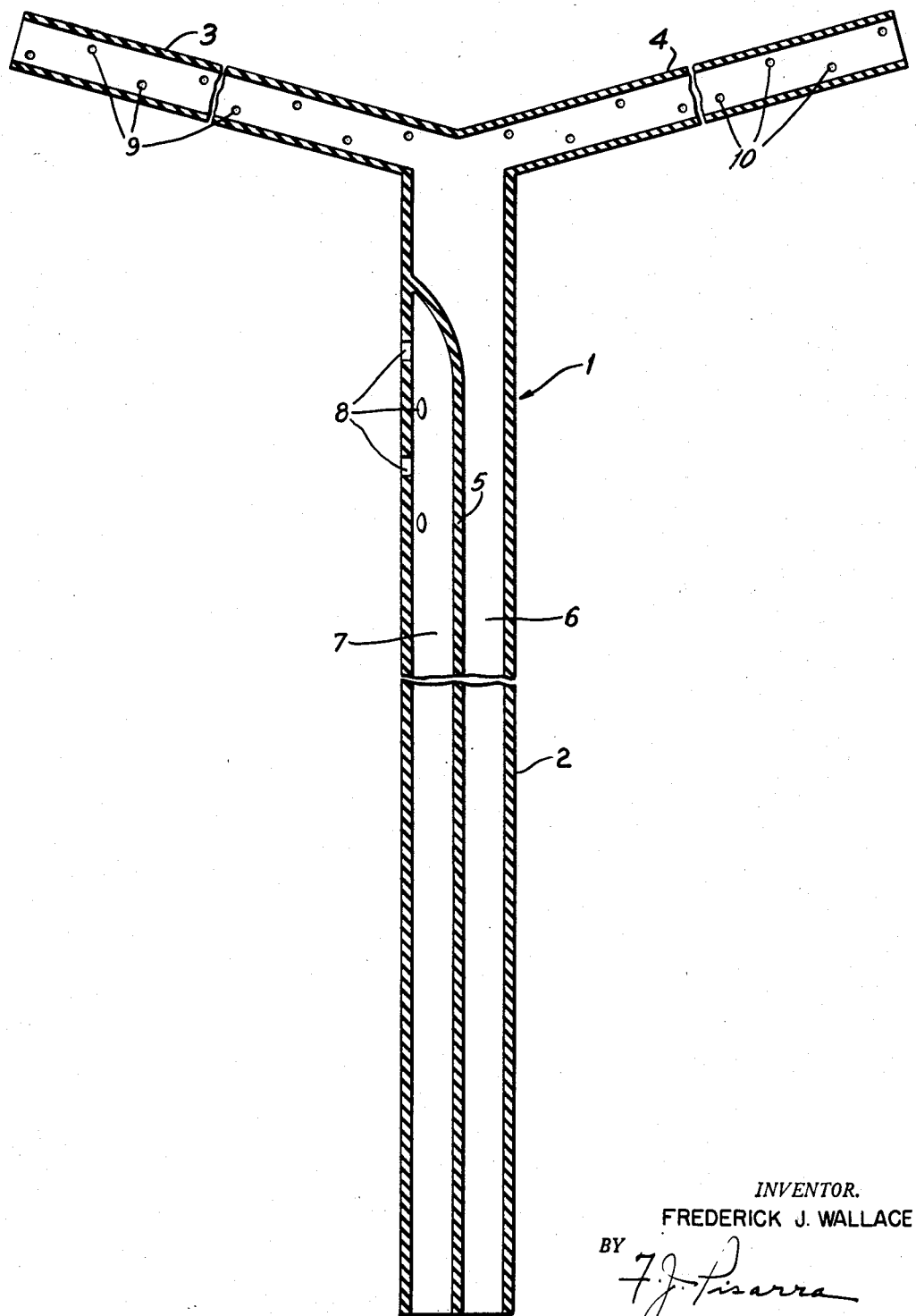

2,624,341

UNITED STATES PATENT OFFICE 2,624,341

CATHETER

Frederick Joseph Wallace, New York, N. Y., assignor to American Cystoscope Makers, Inc., New York, N. Y., a corporation of New York Application July 18, 1950, Serial No. 174,413

4 Claims. (Cl. 128—350)

This invention relates to the art of catheters, and in one of its more specific aspects, to an improved catheter that is especially useful in gastric resection procedures.

It is a primary object of the invention to provide a catheter including tubular arms that are adapted to be positioned in the stomach and so constructed and arranged as to permit drainage of fluids from the stomach or introduction of irrigating fluids into the stomach in the region of resected portions of the same.

Another object of the invention is to provide a catheter of the character indicated that is adapted to simultaneously drain body passages or internal organs and transmit irrigating or other fluids to such organs.

The invention has for an additional object the provision of a catheter capable of performing its intended functions in an efficient manner.

To the end that the above objects may be attained, a catheter constructed in accordance with this invention preferably comprises a unitary, generally Y-shaped, flexible tube open at each end and consisting of first, second and third tubular members. A partition disposed wholly within the first tubular member divides the interior thereof into a through passage that communicates with the second and third members, and a blind passage that terminates rearwardly of the juncture of the first member and the second and third members. A series of openings in the wall of the first tubular member establishes direct communication between the exterior thereof and the blind passage. The second and third tubular members are also provided with through openings in their respective walls. Preferably, and in order to facilitate introduction of the second and third tubes into selected portions of the stomach, the same define obtuse angles with each other and with the first tubular member.

The objects, as well as the advantages attainable by the practice of the invention will be readily understood by persons skilled in the art upon reference to the detailed description that follows, taken in conjunction with the accompanying drawing, which respectively describe and illustrate a catheter embodying the invention.

A catheter constructed in accordance with the invention is shown in central longitudinal section in the drawing.

Referring now to the drawing, the catheter illustrated therein comprises a unitary, generally Y-shaped tube 1 open at each extremity, and made of a suitable flexible material, preferably rubber. The tube consists of an elongated first tubular member or stem 2 and second and third tubular members or arms 3 and 4, which are united to the upper or forward end of member 1 and define obtuse angles therewith and with each other.

A partition 5, also preferably made of rubber, positioned wholly within member 2, has its major portion disposed longitudinally therewithin and terminates rearwardly of the juncture of the first tubular member and the second and third members. This partition divides the interior of member 1 into a through passage 6, that communicates with members 3 and 4, and a blind passage 7. A series of spaced openings 8 establishes communication between the upper or forward portion of blind passage 7 and the exterior of member 2.

Members 3 and 4 are respectively provided with a plurality of drainage or irrigating openings 9 and 10.

In practice, irrigating or other types of fluid are transmitted by the catheter by way of blind passage 7 and openings 8. Similarly, irrigating fluids may be transmitted to resected portions of the stomach by way of through passage 6, members 3 and 4, and corresponding openings 9 and 10. If desired, openings 9 and 10 and through passage 6 may be used for drainage purposes.

Thus it will be seen that the construction herein shown and described is well adapted to accomplish the objects of the present invention. It will be understood, however, that the invention may be embodied otherwise than here shown, and that in the form illustrated certain obvious changes in construction may be made. Therefore, I do not wish to be limited precisely to the construction herein shown except as may be required by the appended claims considered with reference to the prior art.

I claim:

1. In a catheter of the character described, first, second and third flexible tubular members, a partition having its major portion disposed longitudinally along the interior of the first member and dividing the same into a through passage and a blind passage that terminates rearwardly of the forward end of the first member, the first member having a plurality of openings in its wall establishing direct communication between the exterior thereof and the blind passage, said second and third members being connected to the forward end of the first member and communicating with the through passage, said second and third members extending beyond opposite sides of the first member.

2. A catheter in accordance with claim 1 wherein the second and third members define obtuse angles with the first member and with each other and have a plurality of through openings formed in their walls.

3. A catheter comprising a unitary generally Y-shaped flexible tube consisting of first, second and third tubular members, a partition wholly within the first tubular member and dividing the interior of the same into a through passage that communicates with the second and third members and a blind passage that terminates rearwardly of the juncture of the first member and the second and third members, said first member having a plurality of openings in its wall establishing direct communication between the exterior thereof and the blind passage.

4. A catheter in accordance with claim 3 wherein the Y-shaped tube is open at its extremities, the second and third tubular members define obtuse angles with the first member and with each other, and the second and third members have a plurality of through openings in their walls.

FREDERICK JOSEPH WALLACE.

REFERENCES CITED

The following references are of record in the file of this patent:

UNITED STATES PATENTS

| Number | Name | Date |
| --- | --- | --- |
| 256,590 | Pfarre | Apr. 18, 1882 |
| 2,210,744 | Winder | Aug. 6, 1940 |
| 2,230,218 | Asche | Feb. 4, 1941 |